United States Patent [19]

Slocum

[11] Patent Number: 4,461,084
[45] Date of Patent: Jul. 24, 1984

[54] INTERNAL MEASURING GAUGE

[76] Inventor: Roger K. Slocum, 3947 Via Milano, Campbell, Calif. 95008

[21] Appl. No.: 392,298

[22] Filed: Jun. 25, 1982

[51] Int. Cl.³ .............................................. G01B 5/14
[52] U.S. Cl. ................................... 33/165; 33/164 C; 33/167
[58] Field of Search ................ 33/165, 164 C, 164 D, 33/167, 143 R, 199 R, 143 M, 143 J, 143 K, 143 E, 158

[56] References Cited

U.S. PATENT DOCUMENTS

| | | | |
|---|---|---|---|
| 694,804 | 3/1902 | Stromberg | 33/167 |
| 925,280 | 6/1909 | Bosworth | 33/167 |
| 1,425,027 | 8/1922 | Lustrik | 33/165 |
| 1,603,663 | 10/1926 | Cooper | 33/165 |
| 2,516,478 | 7/1950 | Mueller | 33/167 |
| 2,675,624 | 4/1954 | Kristensen | 33/165 |
| 2,724,186 | 11/1955 | Lenart | 33/165 |

Primary Examiner—Willis Little
Attorney, Agent, or Firm—Allston L. Jones

[57] ABSTRACT

The disclosed invention is an internal measuring gauge having a stationary jaw, a bridge member, a pair of shafts each affixed between the stationary jaw and the bridge member parallel one to the other. In addition, there is a sliding jaw mounted on the two shafts between the stationary jaw and the bridge member with a micrometer head mounted on the sliding with its measuring stem extending through a hole in the sliding jaw and extending toward the stationary jaw. Also mounted on the stationary jaw on the side toward the sliding jaw is attachment means for mounting a precision length spacer to which the measuring stem of the micrometer means communicates to provide extended precision range, beyond that of the micrometer head alone. Further, each jaw includes at least one measuring face which is oriented away from the measuring face on the other jaw.

9 Claims, 8 Drawing Figures

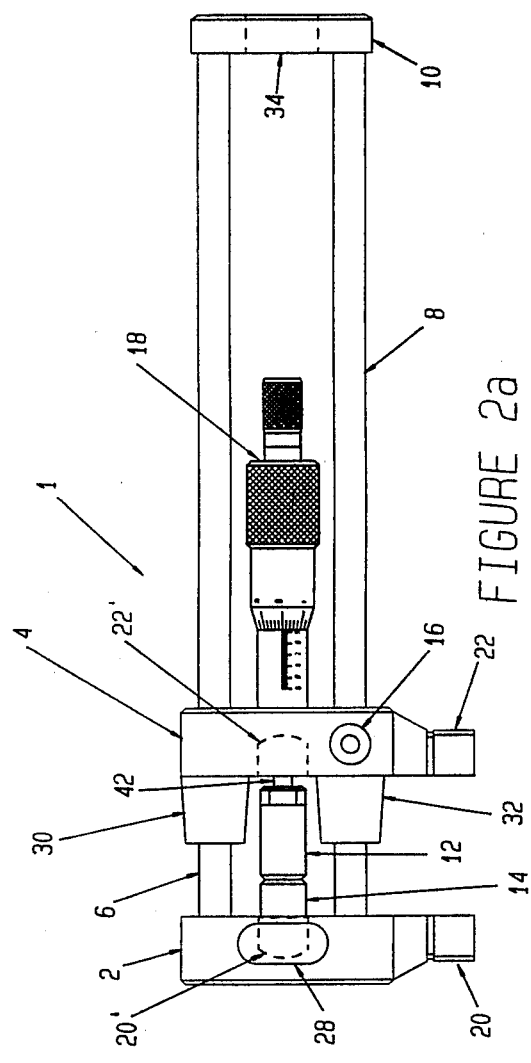
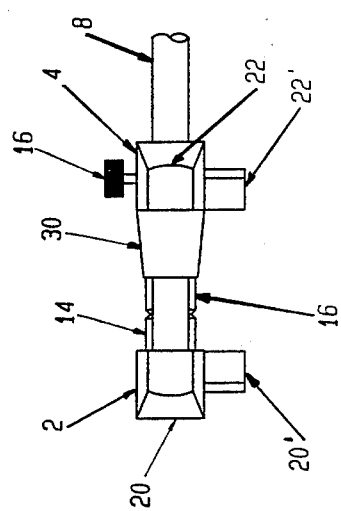
FIGURE 2a
FIGURE 2b
FIGURE 2c

INTERNAL MEASURING GAUGE

BACKGROUND OF THE INVENTION

This invention relates to precision measurement and more particularly to precision measurements of internal dimensions over a broader range than the standard screw thread micrometer head is capable of handling.

The prior art includes numerous devices for making precision measurements by presetting the screw-thread micrometer head to measure the item of the size at hand. One device for making external measurements only, as shown in U.S. Pat. No. 515,235, requires the use of rods of a calibrated length. In this device micrometer head J is set to zero, calibrated rod H is held by hand between anvils C and K while moveable arm D is slid along rail A to close anvils C and K on rod H and then set-screw a' is tightened to hold moveable arm D in place on rail A. This device, because of the hand setting method and the wear on key K and rail A does not provide for repeatable measurements of equivalent accuracy each time.

Another approach in the prior art has been to accurately position a moveable jaw with respect to a fixed jaw by means of pre-positioned posts (U.S. Pat. No. 3,807,049) for external measurements only or holes (U.S. Pat. No. 2,469,926). These also present a problem. Namely, the accurate placement of the pre-positioned posts or holes. Additionally, these present serious problems as a result of normal wear which will result in greatly reduced accuracy of these devices.

A third approach utilizes a micrometer head mounted on a hand positional carriage (U.S. Pat. No. 1,425,027). This lacks precision and the ability to make repeatable measurements since carriage 3 is pre-positioned by aligning the selected index mark 17 to index mark 16 merely by eye. Once carriage 3 is fastened in position by set-screw 15. This, as was the device specified in the first above-referenced patent, is also subject to loss of accuracy due to wear.

What is needed is a precision device which is easy and fast to use without suffering from the problems of wear, inaccurate placement of reference posts or holes, or simple alignment by eye. It is believe that the present invention is such a device.

SUMMARY OF THE INVENTION

In accordance with the illustrated embodiments, the present invention provides an internal measuring device with the same degree of accuracy over a greatly extended range, beyond that of the normal range of the included micrometer head. The measuring device of the present invention includes a stationary jaw, a bridge member, a pair of shafts each permanently connected between the stationary jaw and the bridge member, and a sliding jaw mounted on the shafts between the stationary jaw and the bridge. In addition, there is an attachment means affixed to the stationary jaw on the side toward the sliding jaw for attaching precision length spacers thereto. Also, a micrometer head is affixed to the sliding jaw on the side toward the bridge member with its measuring stem extending through a hole defined by the sliding jaw in alignment with the attachment means.

In one embodiment, the attachment means includes a screw passing through the stationary jaw from the side away from the sliding jaw, a calibrated length spacer on the shaft of the screw, and a precision length spacer screwed onto the screw capturing the calibrated length spacer between it and the side of the stationary jaw toward the sliding jaw.

In another embodiment, the attachment means includes a mounting boss affixed to the side of the stationary jaw toward the measuring stem of the micrometer head, and a clamping collar means for captively retaining a precision length spacer in communication with the mounting boss.

DESCRIPTION OF THE DRAWINGS

FIGS. 2a, b and c show three plane views of a second embodiment of the present invention.

DESCRIPTION OF THE PREFERRED EMBODIMENTS OF THE PRESENT INVENTION

Figure 1A:
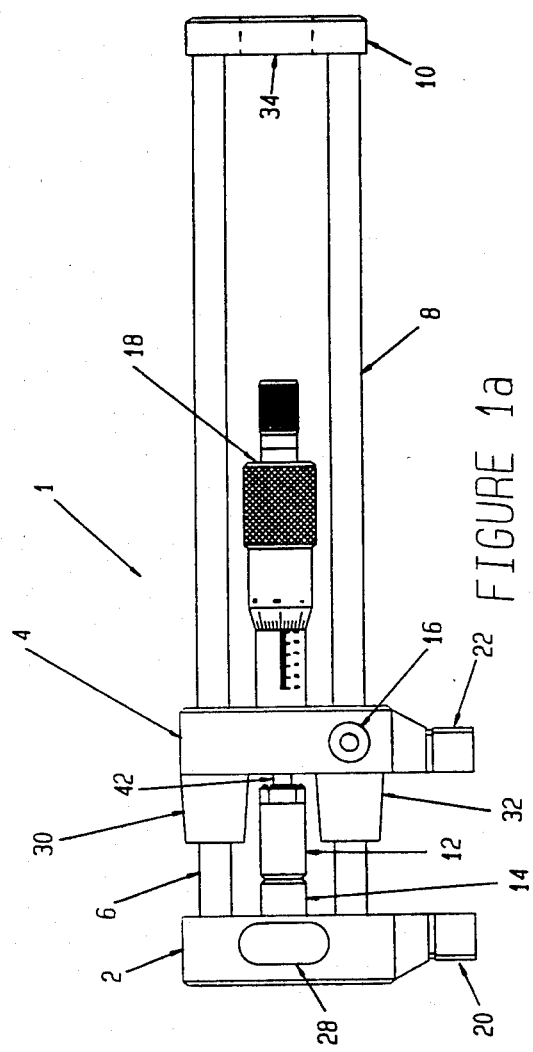
FIGS. 1a, b and c show three plane views of one embodiment of the present invention.

Referring to FIGS. 1a, b and c there is shown a side, a bottom and a front view of the first embodiment of the internal measuring gauge 1 of the present invention. Internal measuring gauge 1 includes a stationary jaw 2, a sliding jaw 4, a pair of shafts 6 and 8, and a bridge 10. Shafts 6 and 8 are affixed within holes in stationary jaw 2 by means of bushings 24 which are press fit into stationary jaw 2. The other end of shafts 6 and 8 are similarly affixed to bridge 10. Thus, a rigid frame is formed with shafts 6 and 8 substantially equidistant from each other over their entire length. Sliding jaw 4 is slideably mounted on shafts 6 and 8 between stationary jaw 2 and bridge 10 by means of bushings 30 and 32, respectively.

The internal measuring gauge also includes precision length spacer means 12 removeably affixed to stationary jaw 2 (discussed more fully below in relation to FIGS. 3 and 4) and a micrometer head 18 of the desired length of travel affixed to sliding jaw 4 with its measuring stem 42 passing through sliding jaw 4 and contacting the end of interchangeable precision length spacer 12. A hole sized to permit micrometer head 18 to pass through is provided in bridge 10 to permit the use of gauge 1 over the maximum extent of shafts 6 and 8.

Each of jaws 2 and 4 include a radiused measuring face 20 and 22, respectively, at the bottom of same. Additionally, there is a lock screw 16 to maintain the spacing between jaws 2 and 4 when screw 16 is tightened down, creating a high friction contact with shaft 8. There is also shown a finger indent in jaw 2 to assist in holding gauge 1 during use.

To use gauge 1 to make an internal measurement, the user first selects and installs a precision length spacer 12 which is shorter than the measurement to be made yet long enough so that the combined length of the precision length spacer 12, calibrated length spacer 14, and the maximum length of travel of micrometer head 18 is greater than the measurement to be made. Micrometer head 18 is then set to zero and its measuring stem 42 is brought into contact with the end of precision length spacer 12. Measuring faces 20 and 22 are then inserted into the object to be measured and micrometer head 18 is adjusted to bring measuring faces 20 and 22 into contact with the sides of the cavity being measured. The resultant measurement is obtained by adding the known length of precision length spacer 12, and calibrated length spacer 14 to the reading on micrometer head 18.

In use, a measuring stem 42 of micrometer head 18 is advanced, it pushes on precision length spacer 12 causing sliding jaw 4 to advance down shafts 6 and 8 away from stationary jaw 2 since micrometer head 18 is affixed to sliding jaw 4. Since measuring stem 42 is not coupled to precision length spacer 12, sliding jaw 4 must be slid toward stationary jaw 2 by the user as measuring stem 42 is retracted.

FIGS. 2a, b and c show the second embodiment of the invention. This embodiment includes all of the elements shown in FIGS. 1a, b and c plus a second pair of measuring faces 20' and 22' on the side of stationary jaw 2 and sliding jaw 4, respectively.

Figure 1B:
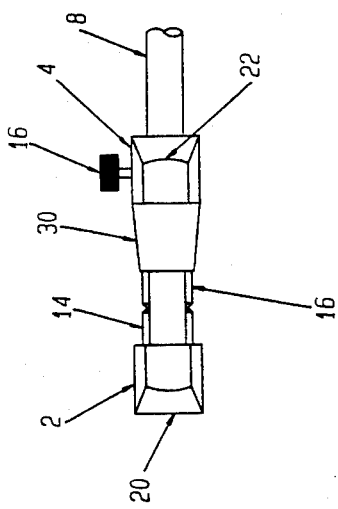
Figure 1C:
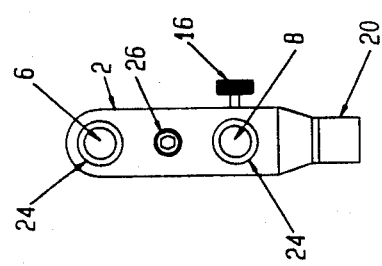
Figure 3:
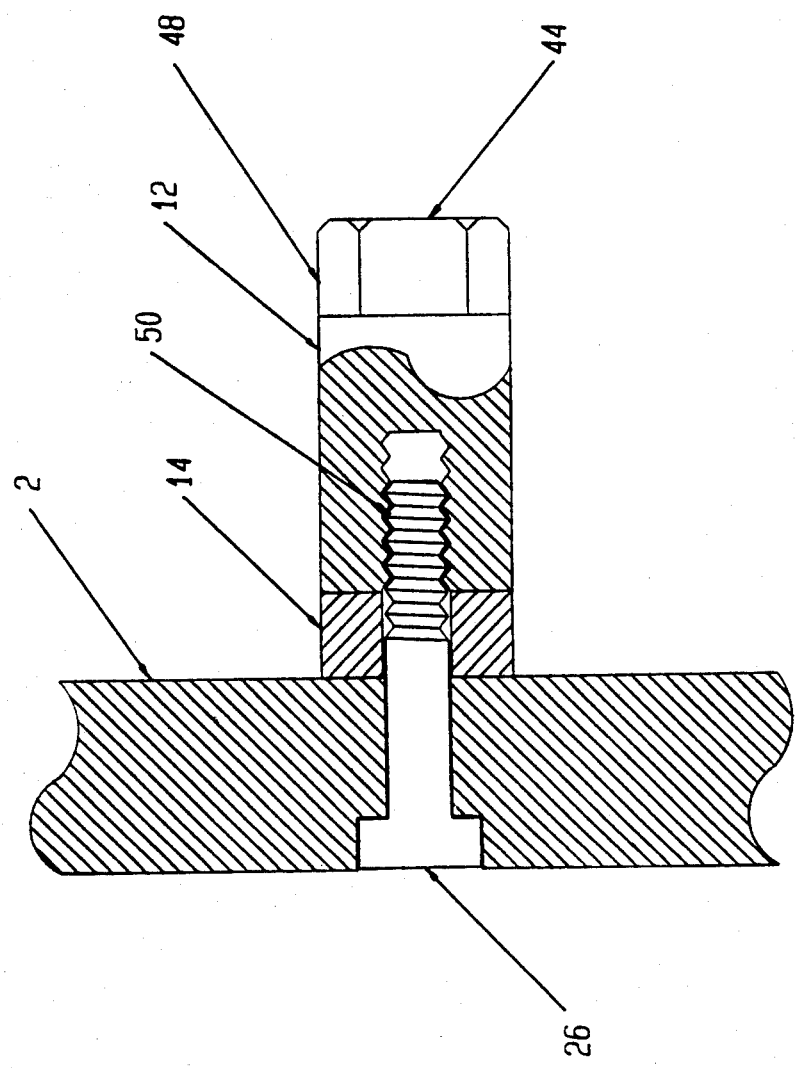
FIG. 3 shows a partial cut-away view of one variant embodiment of the attachment means of the precision length standard to stationary jaw of both embodiments of the present invention.

FIG. 3 shows in detail the means for attaching precision length spacers 12 to stationary jaw 2 as shown in FIGS. 1 and 2. There is shown a portion of stationary jaw with screw 26 extending therethrough from the side of stationary jaw 2 away from sliding jaw 4. On the exposed portion of the shaft of screw 26 is calibrated length spacer 14 which is free to rotate thereabout and then precision length spacer 12 is screwed onto screw 26 by means of threaded cavity 50. Thus, calibrated length spacer 14 is sandwiched between the side of stationary jaw 2 that is toward sliding jaw 4 and precision length spacer 12. To insure the precision of the distance between the surface of stationary jaw 2 and surface 44, a hex head 48 is provided at the end of precision length spacer 12 to wrench tighten it onto screw 26 and to fully seat it and calibrated length spacer 14.

Figure 4:
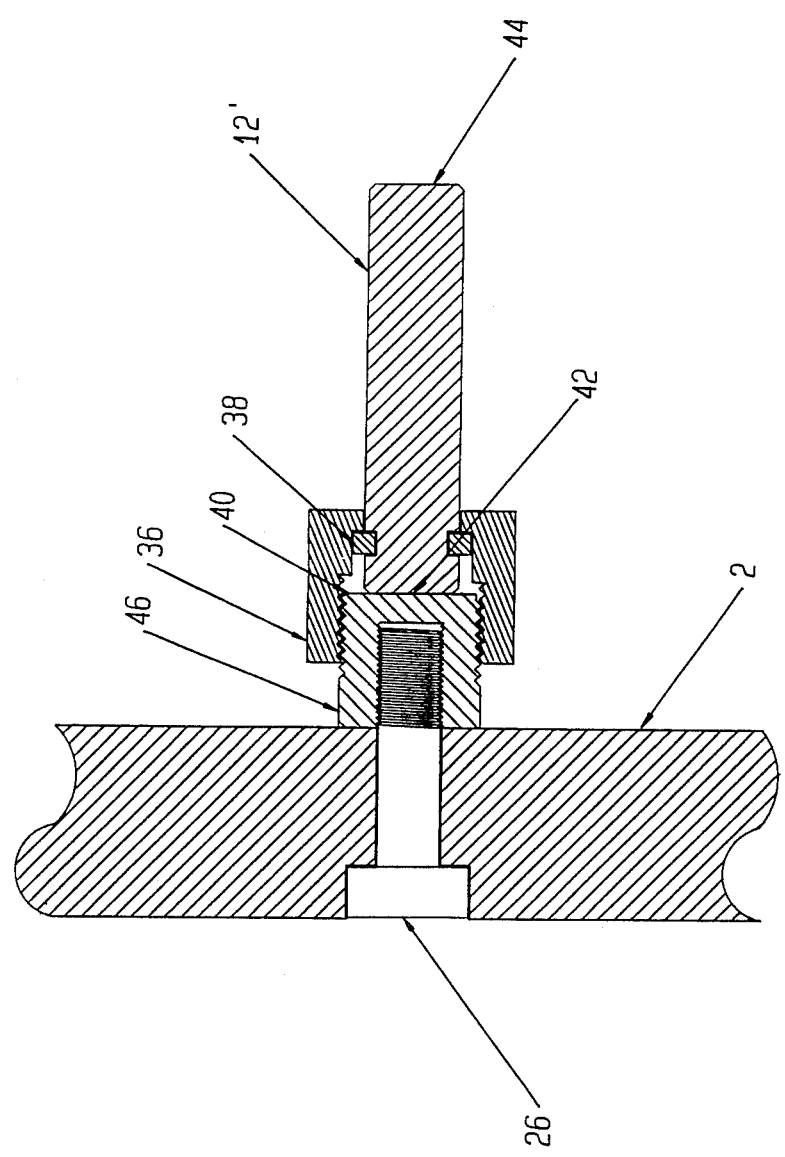
FIG. 4 shows a partial cut-away view of another variant embodiment of the attachment means of the precision length standard to stationary jaw of both embodiments of the present invention.

FIG. 4 shows in detail another variant embodiment of the means for attaching precision length spacers 12 to stationary jaw 2. There is shown a portion of stationary jaw 2 with a calibrated length, threaded, mounting boss 46 affixed thereto by means of screw 26. Precision length spacer 12 includes a crimp ring 38 near one end. Shown in cross-section is clamping collar 36. Clamping collar 36 includes a threaded internal cavity from one end dimensioned to mate with the threads of mounting boss 46. The other end of clamping collar 36 defines a hole therethrough dimensioned to permit the free passage of the main shaft of precision length spacer 12 and to retain crimp ring 38 thereof. When clamping collar 36 is screwed onto mounting boss 46, face 42 of precision length spacer 12 is brought into contact with the forward face 40 of mounting boss 46 to provide a surface 44 which is a selected precision calibrated distance from measuring face 20 or 20' on stationary jaw 2.

Through the use of the proper materials, such as steel and bronze, and known assembly techniques, a guage, as described above, can be constructed which can accurately make internal measurements to within 0.0002 inches over a broader range of measurements than the micrometer head 18 is capable of performing alone if all surfaces are ground square and parallel within 0.0001 inches.

From the foregoing description, it will be apparent that the invention disclosed herein provides a novel and advantageous internal measuring guage. As will be understood by those familiar with the art, the invention may be embodied in other specific forms without departing from the spirit or essential characteristics thereof.

I claim:

1. An internal measuring gauge for use with precision length spacers for extended range, said gauge comprising:
   a stationary jaw;
   a bridge member;
   a pair of shafts each having one end permanently connected to the stationary jaw and the other end permanently connected to the bridge with shafts being substantially parallel one to the other;
   a sliding jaw slideably mounted on the pair of shafts between the stationary jaw and the bridge;
   attachment means for attaching precision length means to the stationary jaw on the side toward the sliding jaw, said attachment means includes:
      a mounting boss affixed to the side of the stationary jaw adjacent the measuring stem of the micrometer head; and
      clamping collar means for captively retaining a precision length means in communication with the mounting boss; and
   micrometer head means affixed to the sliding jaw, on the side toward the bridge member, the micrometer head means including a measuring stem which extends through a hole defined in the sliding jaw means in alignment with the attachment means.

2. An internal measuring gauge as in claim 1 wherein:
   the stationary jaw includes a measuring face, positioned facing away from the sliding jaw; and
   the sliding jaw includes a measuring face positioned facing away from the stationary jaw.

3. An internal measuring gauge comprising:
   a stationary jaw;
   a bridge member;
   a pair of shafts each having one end permanently connected to the stationary jaw and the other end permanently connected to the bridge with the shafts being substantially parallel one to the other;
   a sliding jaw slideably mounted on the pair of shafts between the stationary jaw and the bridge;
   precision length means of a selected length, including a precision length spacer having an axial crimp ring near one end thereof;
   attachment means affixed for attaching the precision length means to the stationary jaw on the side toward the sliding jaw, said attachment means includes:
      a threaded mounting boss affixed to the side of the stationary jaw adjacent the measuring stem of the micrometer head; and
      clamping collar means for captively retaining the crimp ring of the precision length spacer to hold the spacer in communication with the mounting boss; and
   micrometer head means affixed to the sliding jaw on the side toward the bridge member, the micrometer head means including a measuring stem which extends through a hole defined in the sliding jaw means and communicates with the precision length spacer.

4. An internal measuring gauge as in claim 3 wherein:
   the stationary jaw includes a measuring face, positioned facing away from the sliding jaw; and
   the sliding jaw includes a measuring face positioned facing away from the stationary jaw.

5. An internal measuring gauge comprising:

a stationary jaw;

a bridge member;

a pair of shafts each having one end permanently connected to the stationary jaw and the other end permanently connected to the bridge with the shafts being substantially parallel one to the other;

a sliding jaw slideably mounted on the pair of shafts between the stationary jaw and the bridge;

attachment means including first threaded means extending through and outward from the side of the stationary jaw toward the sliding jaw;

precision length means including:
- a calibrated length spacer for rotationally mounting on the outwardly extending first threaded means; and
- a precision length spacer having a first machined surface, said spacer defines a second threaded means for mating with said first threaded means sandwiching said calibrated length spacer between said stationary jaw and first machined surface; and micrometer head means affixed to the sliding jaw on the side toward the bridge member, the micrometer head means including a measuring stem which extends through a hole defined in the sliding jaw means and communicates with the precision length spacer.

6. An internal measuring gauge as in claim 5 wherein:
the stationary jaw includes a measuring face, positioned facing away from the sliding jaw; and
the sliding jaw includes a measuring face positioned facing away from the stationary jaw.

7. An internal measuring gauge as in claim 5 wherein:
the first threaded means of the attachment means has outwardly projecting threads; and
the second threaded means of the precision length spacer includes inwardly projecting threads located within an interior cavity defined at one end of the precision length spacer generally perpendicular to the first machine surface for screwing onto the outwardly projecting threads of the attachment means.

8. An internal measuring gauge as in claim 7 wherein said precision length spacer further includes tightening means generally perpendicular to the longitudinal axis of said tapped cavity for sealing the spacer and said calibrated length spacer with said stationary jaw.

9. An internal measuring gauge as in claim 5 wherein:
the first threaded means of the attachment means includes inwardly projecting threads located within an interior cavity defined within the end thereof toward the sliding jaw; and
the second threaded means of the precision length spacer includes outwardly projecting threads at one end thereof for screwing into the threaded cavity of said attachment means.

* * * * *